United States Patent
Filipovic et al.

(10) Patent No.: US 8,477,810 B2
(45) Date of Patent: *Jul. 2, 2013

(54) SYNCHRONIZATION USING MULTICASTING

(75) Inventors: Predrag Filipovic, Princeton Junction, NJ (US); Israel Amir, Princeton, NJ (US)

(73) Assignee: Lee Capital LLC, Wilmington, DE (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/268,922

(22) Filed: Nov. 11, 2008

(65) Prior Publication Data
US 2009/0067452 A1  Mar. 12, 2009

Related U.S. Application Data

(63) Continuation of application No. 10/235,366, filed on Sep. 5, 2002, now Pat. No. 7,457,320.

(60) Provisional application No. 60/317,274, filed on Sep. 5, 2001.

(51) Int. Cl.
*H04J 3/06* (2006.01)
(52) U.S. Cl.
USPC ............................. 370/503; 370/390; 370/350
(58) Field of Classification Search
USPC ................. 370/252–256, 390, 350, 432, 503, 370/508–510; 709/248
See application file for complete search history.

(56) References Cited

U.S. PATENT DOCUMENTS

| | | | |
|---|---|---|---|
| 5,327,581 | A | 7/1994 | Goldberg |
| 6,247,072 | B1 | 6/2001 | Firestone |
| 6,256,673 | B1 | 7/2001 | Gayman |
| 6,269,080 | B1 | 7/2001 | Kumar |
| 6,311,283 | B1 | 10/2001 | Gonzalez |
| 6,453,237 | B1 | 9/2002 | Fuchs et al. |
| 6,459,708 | B1 | 10/2002 | Cox et al. |
| 6,801,951 | B1 | 10/2004 | Roden |
| 7,023,816 | B2 | 4/2006 | Couillard |
| 7,035,246 | B2 * | 4/2006 | Taylor ......................... 370/350 |
| 7,587,746 | B1 * | 9/2009 | Schwartzman et al. ...... 725/111 |

OTHER PUBLICATIONS

Stolowitz Ford Cowger LLP; Related Case Listing; Sep. 6, 2010; 1 Page.

* cited by examiner

*Primary Examiner* — Dady Chery
(74) *Attorney, Agent, or Firm* — Stolowitz Ford Cowger LLP

(57) ABSTRACT

A process to synchronize information transmitted from an information provider to a plurality of network elements is provided. The process determines a temporal difference between related network elements and compensates for this difference by dilating an information signal provided to at least one of the network elements to resynchronize the data presented to the network elements. The process is repeated periodically in order to maintain a desired synchronization level.

19 Claims, 8 Drawing Sheets

SYNCHRONIZATION USING MULTICASTING

CROSS-REFERENCE TO RELATED APPLICATION

This application is a continuation of U.S. patent application Ser. No. 10/235,366 filed Sep. 5, 2002, now issued as U.S. Pat. No. 7,457,320, which claims priority to U.S. provisional application No. 60/317,274, filed Sep. 5, 2001, the contents of all of which are incorporated herein by reference.

BACKGROUND

The use of packet-based communication in the home has increased dramatically in the last few years and is poised to explode in the near future. The medium for connecting devices in the home network is varied. It ranges from dedicated wired, to wireless, phone lines and recently also power lines connections. Currently, the main application of networks in the home are to connect computers and share Internet connections, but other applications loom on the horizon. One of the prominent candidates for home LAN applications is audio and video distribution. Synchronization of the different components is very important in making these applications viable. An advanced audio system, for example, may be composed of several speakers spatially separated from each other and interconnected with a LAN. To maintain a high fidelity, it is important that all the audio streams are synchronized to within about 10-20 milliseconds. Larger delays will be perceptible and will negatively impact the listening experience.

Another related problem that tends to occur when using today's digital music is the phenomenon of time drift. To illustrate the problem, assume that synchronization is achieved between the remote speakers at a certain point in time. Furthermore, assume that the long-term clock accuracy of the network element's crystal oscillator is on the order of $50*10^{-6}$. (Better accuracy is achievable, but at a price). The music on one device will run faster (or slower) than on the other devices. This time-drift from the point in time where the two devices are synchronized is readily calculated to yield (approximately):

$$D=I*T \quad \text{(Eq. 1)}$$

where D is the time drift, T is the time lapsed from the point of synchronization, and I is the frequency inaccuracy.

So, for example, after 5 minutes of play time (from synchronization) the drift between two speakers becomes:

$$D=100*10^{-6}*300=30 \text{ Milliseconds} \quad \text{(Eq. 2)}$$

Clearly, this is not tolerable. Thus, it would be very beneficial if a practical solution to the above problem would be found.

SUMMARY OF INVENTION

The present invention is embodied in a method for synchronizing information transmitted from an information provider to a plurality of elements in a TCP/IP network. The method includes the step of transmitting at least a first control signal from the information provider to the plurality of elements using multicasting.

According to an aspect of the present invention further steps include receiving a signal from each of the network elements in response to the control signal; transmitting information to the network elements responsive to the signals received from the network elements; transmitting a further control signal from the information provider to the network elements using multicasting; receiving a state signal from each of the network elements in response to the further control signal; comparing the respective state signals with one another to determine a time drift between the plurality of elements; and transmitting a correction signal from the information provider to at least one of the plurality of elements based on the comparison.

According to one aspect of the invention, respective timers in each of the network elements are reset based on the initialization signal.

According to another aspect of the invention, the respective timer in each of the network elements is adjusted based on the correction signal.

According to yet another aspect of the present invention, a method for dilating a signal is provided. The method comprises the steps of duplicating at least a portion of the signal to generate a second signal; applying a first attenuation profile to the first signal and a second attenuation profile to the second signal to generate a first attenuated signal and a second attenuated signal; padding each of the first and second attenuated signals with a predetermined number of leading zeros and trailing zeros, respectively, to generate a first padded signal and a second padded signal; and summing the first padded signal and the second padded signal to generate a time dilated signal.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 1:
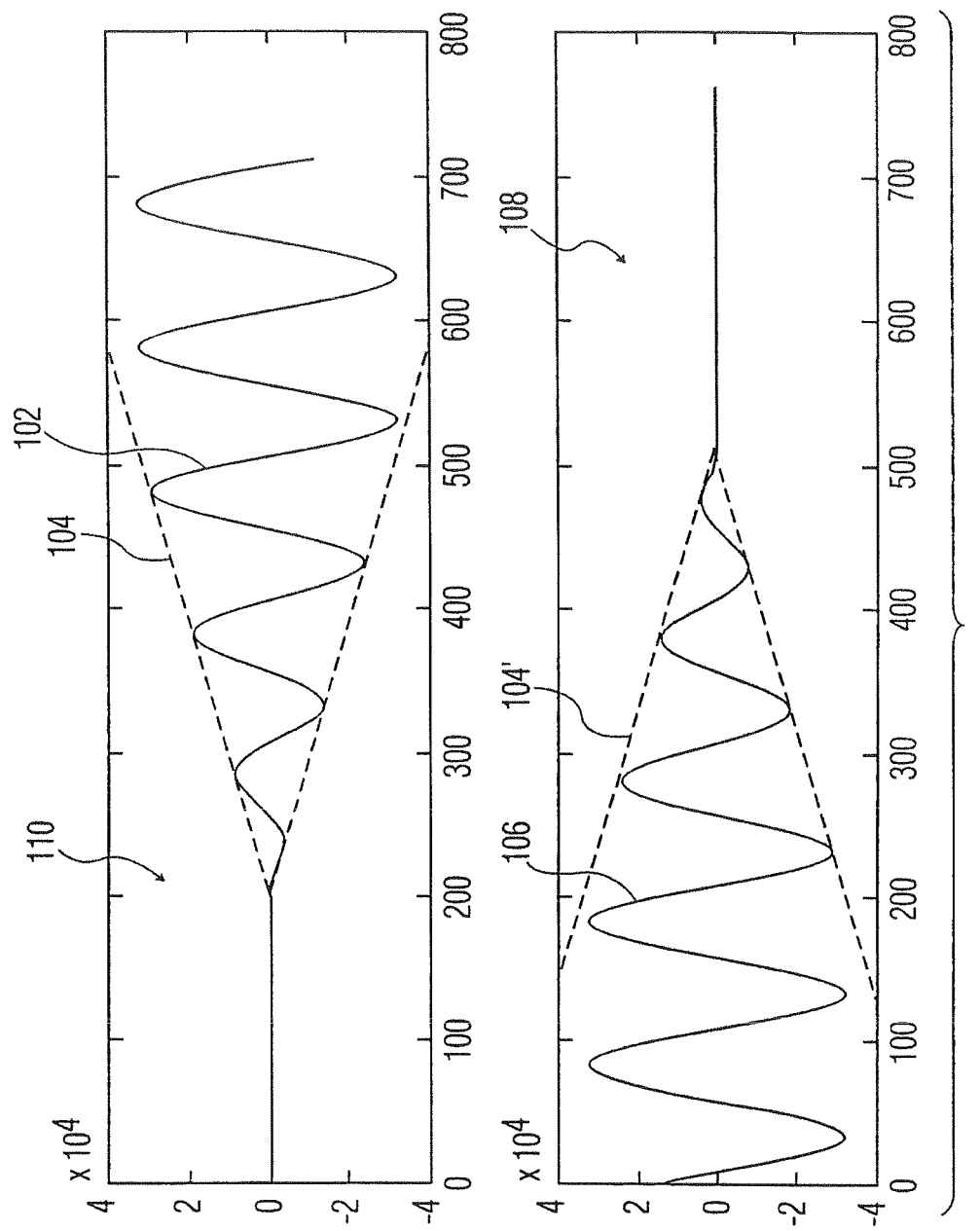
FIG. 1 is an illustration of a carrier wave (CW) section used to create two complementary signals according to the subject invention.

The subject invention is embodied in a process to synchronize information transmitted from an information provider to a plurality of network elements.

Overview

There are two main elements to the present invention:
1. Clock synchronization
2. Time drift compensation

Clock Synchronization

Clock synchronization, as defined herein, is the operation of setting up a unified time base in all network elements. The main problem is that the network presents unknown delays that make time synchronization difficult. In order to achieve accurate synchronization, the present invention uses multicasting in conjunction with server-client architecture. Table 1 represents an exemplary synchronization process between various remote network components 704 (in this case speakers) facilitated by a centralized server 702 (best shown in FIG. 7).

TABLE 1

Exemplary process of establishing and maintaining synchronization between two remote network elements.

| Server | Speaker-1 | Speaker-2 | Type | When |
|---|---|---|---|---|
| Start-time, Δ | | | Multicast | At start-once |
| | Ack | Ack | Unicast | At Start-once |
| Streaming information (audio/music) | | | Multicast/ Unicast | Continuous |
| Request for timer state | | | Multicast | Periodic |
| | Timer-state (periodic) | Timer-state (periodic) | Unicast | Periodic-response |
| Correction-individual | | | Unicast | As needed |
| | Correction Ack | Correction Ack | Unicast | On execution |

The exemplary process steps are as follows:
1. Server multicasts a synchronization packet (referred to as "time of origin" packet) and start-time for streaming relative to the time-0 (usually a few seconds in the future).
2. Network elements acknowledge receipt of synchronization packet and start time.
3. Server streams information to network elements. In this example the network elements are speakers and the information is audio/music.
4. Periodically, server sends request for "timer state" from the network elements.
5. Network elements send their timer state in response to requests.
6. Server sends time correction needed to the different network elements to adjust for time-drifts.
7. Network elements correct their timers and act to adjust the time drift.

The details relating to these steps are described below.

Time Drift Compensation:

The present invention also discloses a method to adjust (compensate) for time drifts. According to an exemplary embodiment of the present invention, there are three parts to the time-dilation (gap filling) algorithm:
1. Selecting a digital audio section (typically a PCM signal) and deciding if the section is a candidate for time dilation according to its frequency response (i.e., most energy is above a set frequency (say 1000 Hz)).
2. Computing the section's autocorrelation function to determine the optimum time dilation (K) in a pre-specified range.
3. Creating two output sections from the digital audio section in the following way: The first output section composed of the digital audio section is padded with K zeros in front and the second output section with the digital audio section with K zeros at its end. The output sections are modulated in a complementary way such that they smoothly fade-in and fade-out into each other (see detailed description below). The two modulated sections are then summed to create a larger time dilated section without audible discontinuities.

Details of the Exemplary Algorithm

Although the exemplary embodiment is described herein with respect to speakers for simplicity, the present invention is not so limited. The present invention is equally suitable for synchronizing other types of remote network elements.

Clock Synchronization:

TCP/IP networks are extremely efficient in delivering data. The quality of service (QOS) of these networks, as defined by maximum latency allowed, is not appropriate in many cases, however, for delivering real-time information. When transmitting audio/music (or video) on such networks, there is no real need (in many cases) for real time processing. Conventionally, the variable delay between the server and the client is compensated by having a large buffer on the client side and by using forward error correcting codes (ECC) to reduce the need for retransmission of lost packets. When two different network components need to be synchronized, however, such methods do not help. In fact, buffering queues, usually put in the front end of a TCP/IP process, just add to the general difficulty in establishing a common timeframe in the different network elements on the same network.

One element of this part of the invention is the use of multicasting to improve the synchronization process. The improvement is primarily due to: (1) Multicast packets transmitted to multiple network elements leave the server as the same packet. This is in contrast to Unicasting where different packets are sent to different network elements. This eliminates any time differences in time-stamp transmittal in the server; (2) Instead of different packets traveling in the same route, it is the same packet traveling, again, eliminating any possible time-of-arrival differences on the same network. In the last "leg" of the trip, the same multicast packet is essentially duplicated and sent to the individual network element.

Another part of the present invention is the substantial reduction, and in some cases the total elimination, of the non-uniform delays (on the network elements) for processing of arriving packets. To achieve this result, a change in the conventional way of embodying TCP/IP stacks (in which buffering queues at the receiving end is introduced) is incorporated. In one embodiment, a latency of no more than 10 microseconds is achieved before a packet header is processed and its time-of-arrival stamp is established. In another embodiment, a latency of less than 5 milliseconds is achieved before a packet header is processed and its time-of-arrival stamp is established.

Figure 6:
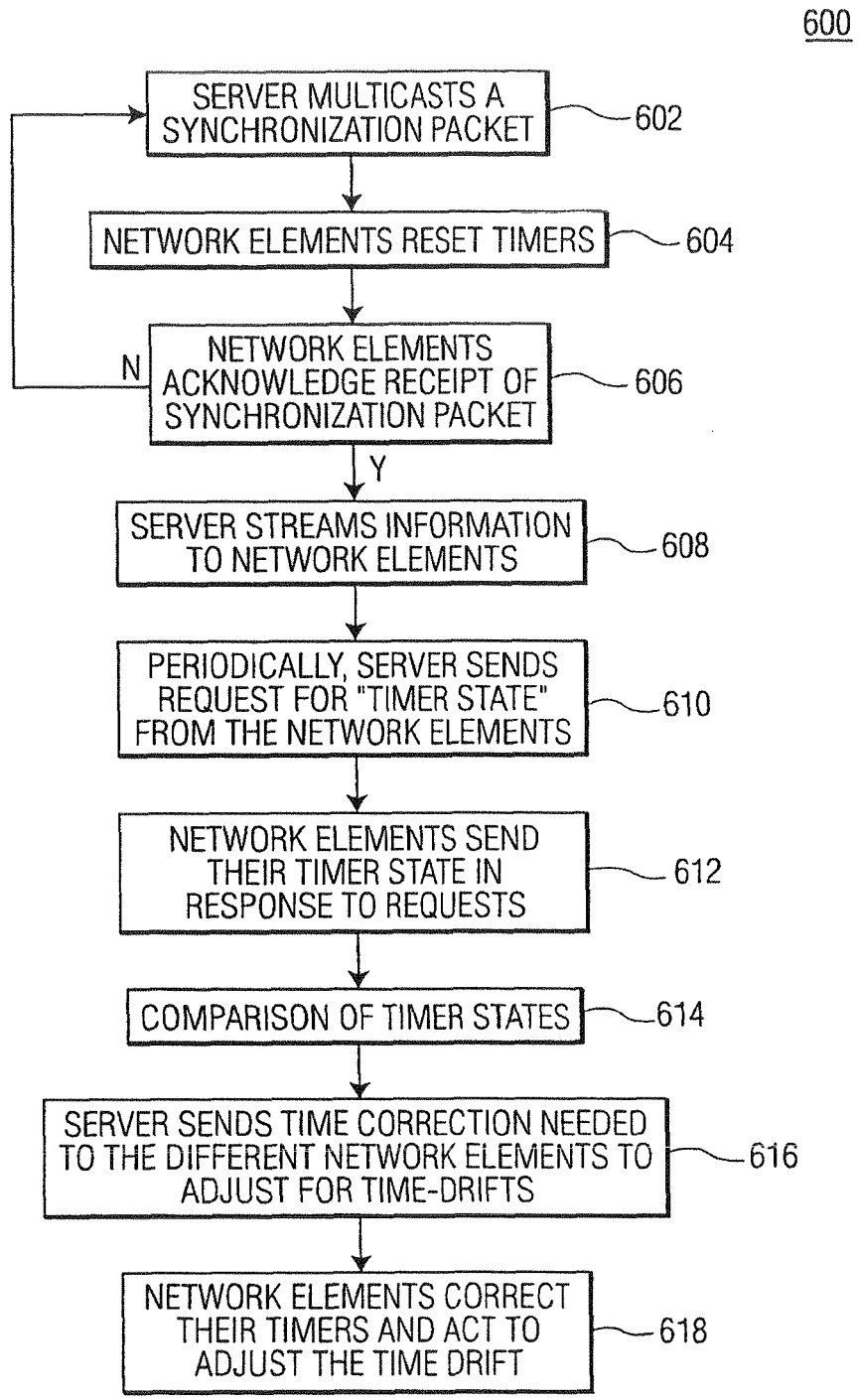
FIG. 6 is a flow chart of an exemplary process incorporating the present invention.
Figure 7:
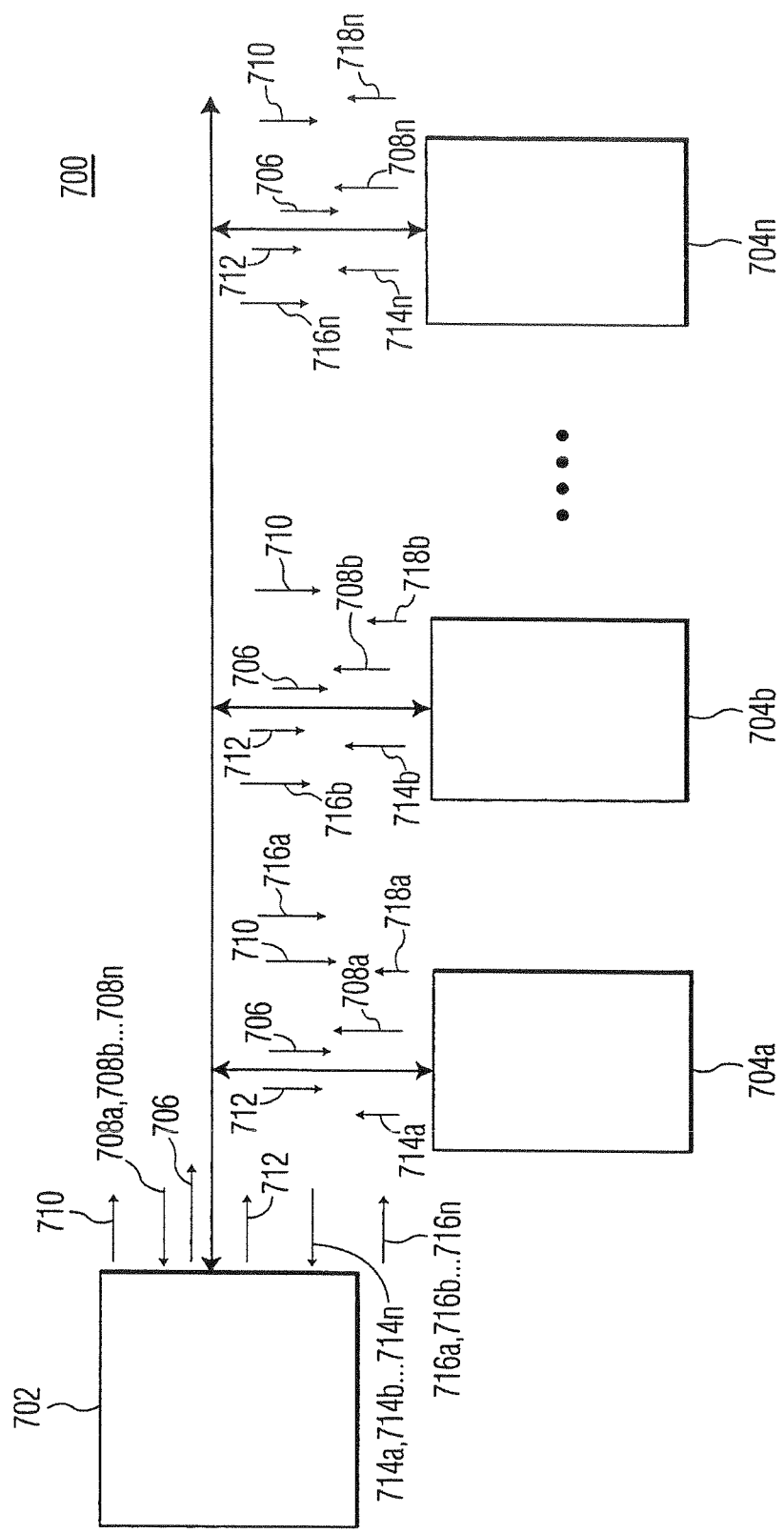
FIG. 7 is a block diagram of a system incorporating the present invention.

The computer synchronization process is shown in Table 1 (above) and described in detail below with reference to flow chart 600 shown in FIG. 6 and the block diagram of system 700 shown in FIG. 7.

Line 1: A universal time base, $T_0$, is established. At step 602, the server 702 transmits a "time of origin" or synchronization signal, $T_0$, 706 using multicast. Once a client (network element) 704a, 704b, ... 704n receives the single packet establishing a time-base (or time of origin), at Step 604 the client 704a, 704b, ... 704n sets (resets) its respective timer (not shown) to zero. Note, that while the time it took the packet to reach client 704a, 704b, ... 704n may be large and unknown, the "time of origin" difference between two clients that are reasonably close (by network distance), such as 704a and 704b, is very small. With the "time of origin" packet 706, information regarding the "relative start-time" of playing audio or music is also included. This time is relative to the time of origin (5 seconds, for example). This "start time" is needed for two reasons: (1) to let the server 702 get the acknowledgements from clients 704a, 704b, . . . 704n that they indeed received the "time of origin packet" 706 and (2) to allow the buffering of enough data to enable smooth client operation. The "time of origin" packet 706 is normally sent once in a session, and generally at the beginning of the session. In this context a session is defined as a connection that is established using the method described herein. It is important to note that, under certain conditions, Unicast is also possible and can be used where multicasting is not supported.

Line 2: Once the client 704a, 704b, . . . 704n receives the "time of origin" packet. At step 606, it transmits back a respective acknowledgement signal 708a, 708b, . . . 708n, indicating that it received synchronization signal 706 and initialized its respective timer. In the event that not all network elements acknowledged the receipt of the "time of origin" packet, a second "time of origin" packet is sent. Streaming of information (audio/music or video, for example) would not start until all network elements 704a, 704b, . . . 704n acknowledge the receipt of the "time of origin" packet signal 706. The "relative start time" takes into account the delays associated with the acknowledgements. The acknowledgement is accomplished using Unicast and is generally done once in a session.

Line 3: At step 608, content 710 is transmitted to network elements 704a, 704b, . . . 704n using Multicast or Unicast.

Line 4: If the clocks associated with the respective remote network elements were identical, further synchronization would not be necessary. This is true assuming that no packets are lost (and in case packets are lost they are retransmitted through the TCP protocol or by any other applicable packet loss recovery method). Unfortunately, in practical application the clocks on the different network elements are not locked with one another. Slight variations in otherwise identical crystals cause a time drift among the different network elements. Explained next is the approach for how to recover from such time drifts. Specifically, the present invention concentrates on detecting and quantifying the time drift. Time drifts accumulate as a function of time as shown in Eq. 1 above. Even very small clock differences can accumulate, given enough time, to induce noticeable, audible effects. In order to correct for such time drifts, at Step 610 server 702 sends a "request for timer state" signal 712 periodically, such as every minute for example, as measured by the server (the accuracy of the "period of time" is not important) to all network elements 704a, 704b, . . . 704n. This is preferably done using multicast to ensure that all network elements 704a, 704b, . . . 704n receive the request signal 712 at the same time. Again, Unicast is also possible and can be used where multicasting is not supported.

Line 5: Once the network elements 704a, 704b, . . . 704n receive the "request for timer state" signal 712, at Step 612 they send back their respective timer state signal 714a, 714b, . . . 714n at the time they received the request signal 712. Note, that with the architecture modification, an arriving packet header is processed almost immediately and its time stamp is very accurately established. Timer state signal 714a, 714b, . . . 714n is returned to server 702 using Unicast and always in response to a "request for timer state" signal 712.

Line 6: Once the server 702 receives the "timer state" signal 712 from all network elements 704a, 704b, . . . 704n, it computes corrections (if needed) for each one of the elements. Note that the server 702 compares only the timer states of the elements 704a, 704b, . . . 704n and does not consider its own timer in the calculation. The latest (most latent) timer state received from network elements 704a, 704b, . . . 704n, is the basis for defining the correction. In the present invention, this particular timer will not need any correction. At Step 614, the latency difference between timer state signals 714a, 714b, . . . 714n and the most latent timer state signal is determined. At Step 616, any other timer that exceeds a predefined limit, based on the comparison of Step 612, is sent an instruction 716a, 716b, . . . 716n to time dilate its respective signal to compensate for the time drift. (This process will be detailed in the next section). This is done in Unicast as needed.

Line 7: At step 618, clients 704a, 704b, . . . 704n receive the respective time drift correction instruction 716a, 716b, . . . 716n from server 702 as needed, execute the time dilation, readjust its respective clock to reflect the correction, and send an acknowledgement signal 718a, 718b, . . . 718n to the server 702. This is done in Unicast in response to a request for time drift correction.

Figure 2:
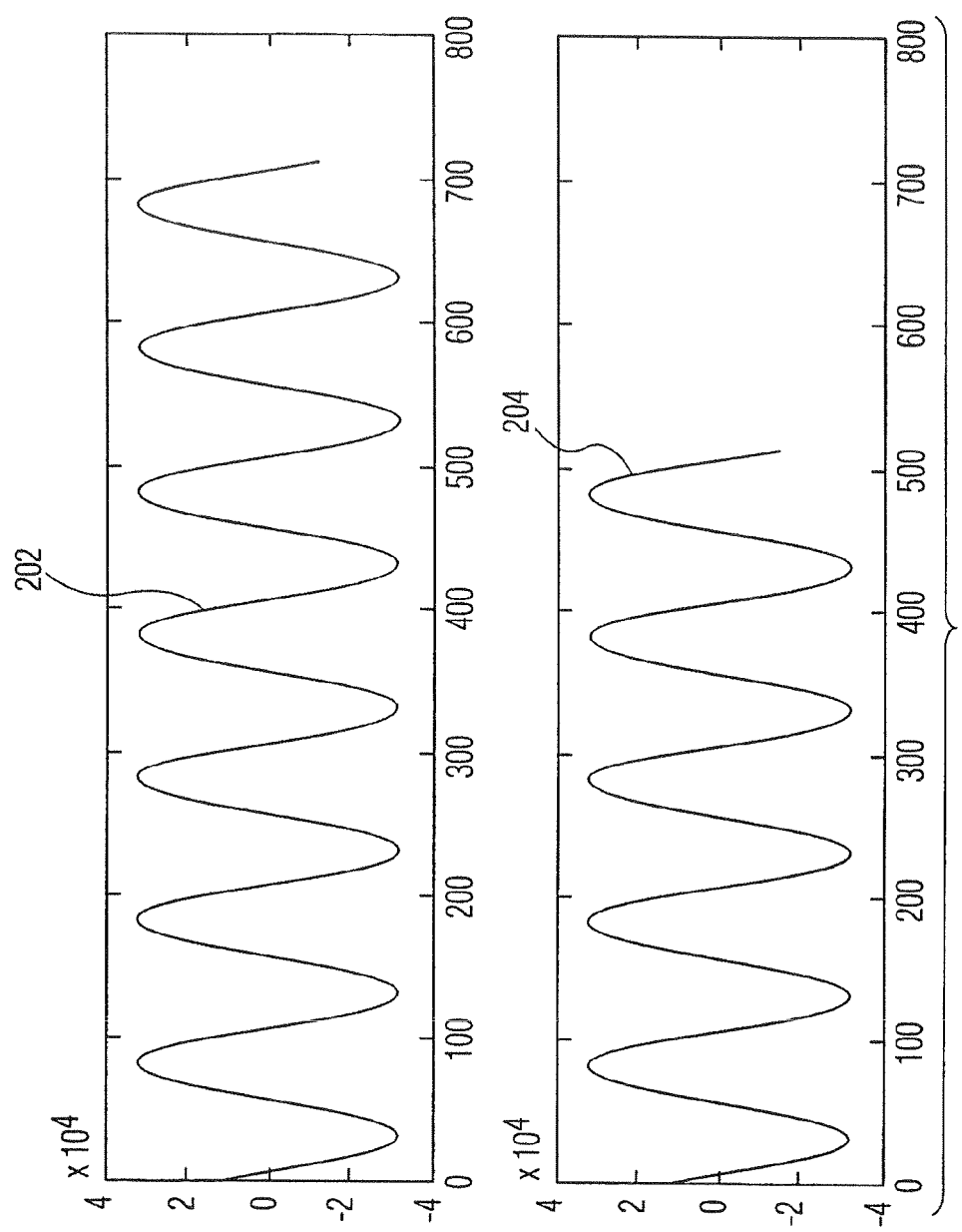
FIG. 2 is an illustration of a dilated signal and an original signal according to the subject invention.
Figure 8:
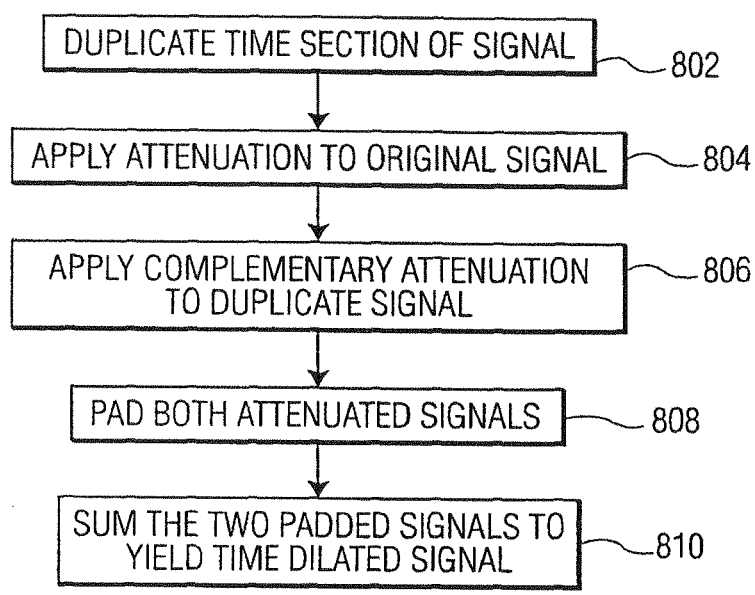
FIG. 8 is a flow chart of another exemplary process incorporating the present invention.

Time Dilation:

To illustrate the exemplary "time dilation" method, performed in clients 704a, 704b, . . . 704n as needed, reference is made to FIGS. 1, 2 and the flow chart 800 illustrated in FIG. 8.

As shown in FIGS. 1 and 8, at Step 802, a time section of a signal (best shown in the lower portion of FIG. 2) is first duplicated. At Step 804, a linear attenuation 104 is applied to the front part of the first section, such that signal 102 is subject to greater attenuation at the beginning 110 of the section. The attenuation 104 is then slowly and linearly reduced such that at a point before the section ends the signal is no longer subject to attenuation. Likewise, at Step 806, the second section has a complementary attenuation profile 104' applied for which the end 108 of the section 106 is completely attenuated and the attenuation is linearly decreased going backward in time. Next, at Step 808, the two time series are offset, with the first section padded with leading zeros and the second section padded with trailing zeros, to create two sections that are identical in length. Next, at Step 810, the two signals 102 and 106 are summed to create a time-dilated version of the input section. The exact profile of the attenuation and the number of zeros needed for padding are determined from the correlation function of the section. Using this method the two signals are summed in phase. The resultant signal 202 of the summation is shown in FIG. 2 (top), while the original signal 204 without dilation is shown at the bottom of FIG. 2.

Time Drift Compensation:

A detailed description of the steps for time drift compensation according to the present invention is outlined below:

First, a time series is selected to which the time drift compensation will be applied. Preferably, the series size is composed of $2^N$ points, where N is an integer. (This is because the present invention intends to use the FFT operation on the signal. Other sizes are also possible with appropriate padding). In the exemplary embodiment, either 256 or 512 points are used in the time series. The section is then tested for spectral distribution. In the present invention, it is important that signal energy be significantly existent in frequencies above a specified threshold. This is done because when the two sections are subsequently summed it is preferable that they be "in phase". In order to be "in phase," power above a set frequency has to exist. This will become clearer when the conditions needed for the spectral distribution are addressed in detail below.

Figure 3:
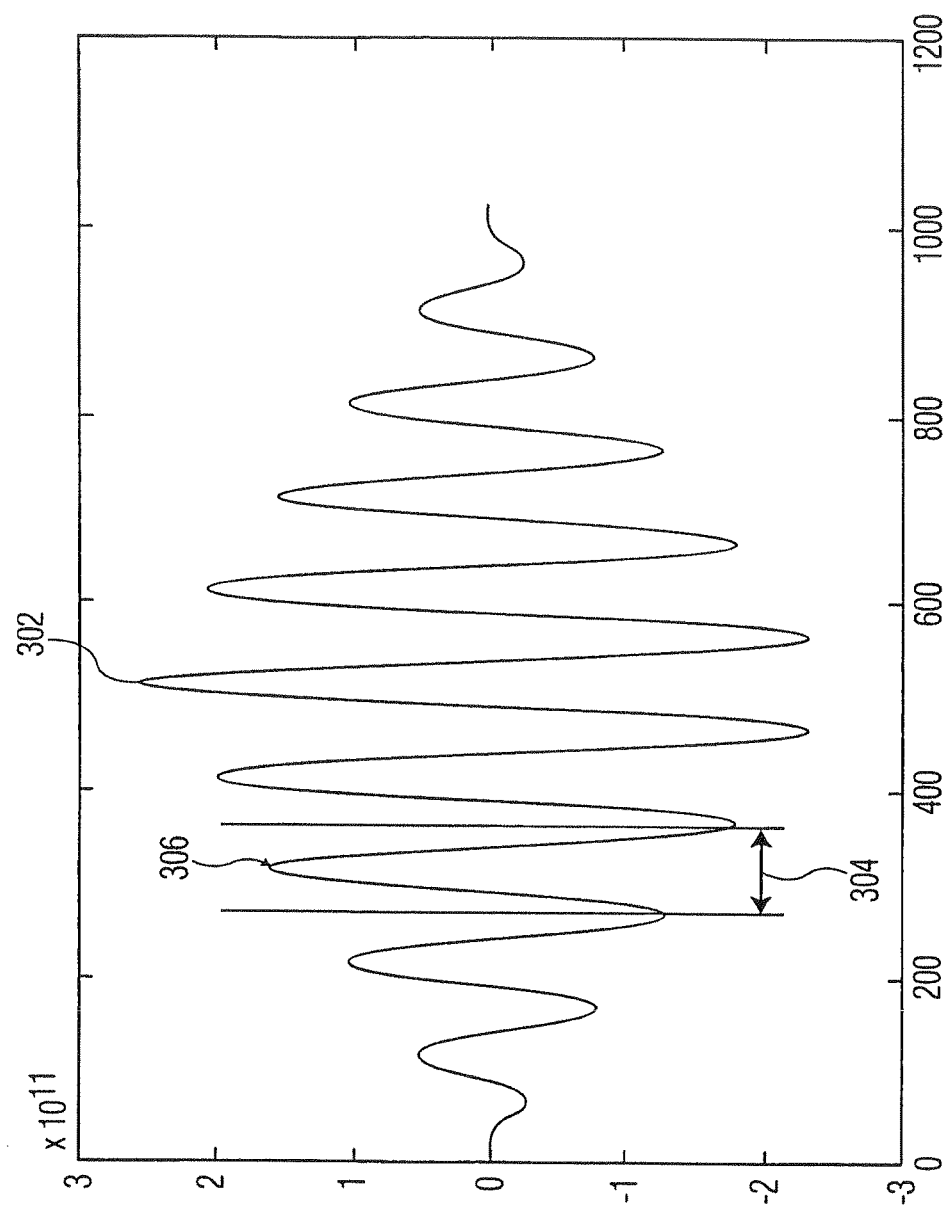
FIG. 3 is an illustration of the section autocorrelation function, the allowed range and the peak defining the delay according to the subject invention.

Next, the autocorrelation function of the chosen section is computed and the peak is found at a time delay in a specified range away from the center. Referring now to FIG. 3, an example of the autocorrelation function of a carrier wave 302 is shown. The delay range 304 and the sought after peak 306 defining the delay are also shown.

Figure 4:
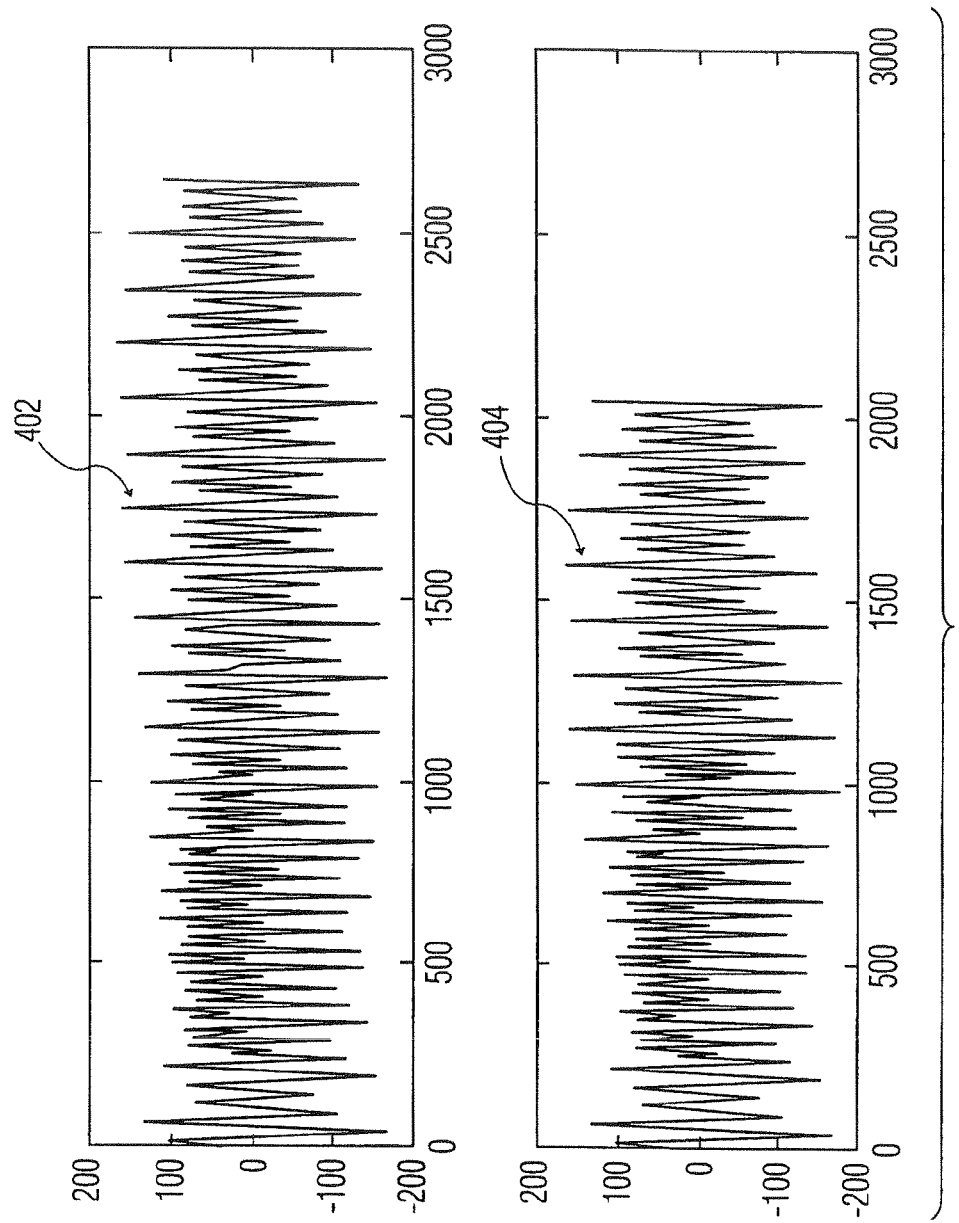
FIG. 4 is an illustration of an example of the application of the present invention to a signal.
Figure 5:
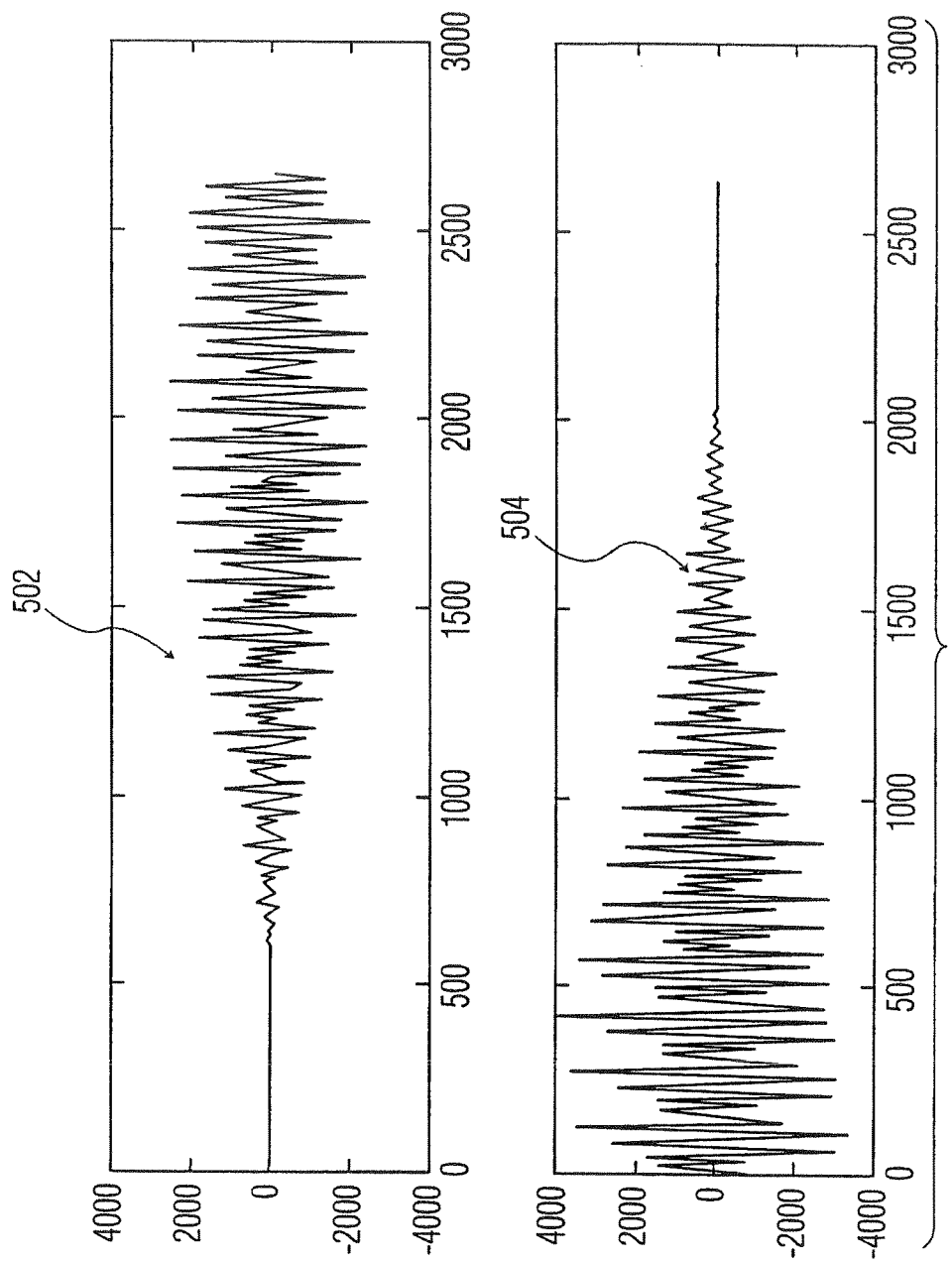
FIG. 5 is an illustration of sections used to form the signal shown in FIG. 4.

As was explained above in the overview, a time section is taken and duplicated. Then a linear attenuation is applied to the front part of the first section such that the signal is greatly attenuated at the beginning of the section, and slowly, but linearly, the attenuation is reduced such that somewhere before the section ends the signal is no longer subject to attenuation (see, the attenuation profile 104 of FIG. 1). Likewise, the second section has a complementary attenuation profile 104' (shown in FIG. 1) for which the end of the section is completely attenuated and the attenuation is linearly decreasing going backward in time. The two time series are then offset by the amount of delay determined above. This is done to provide an "in phase" summation of the two delayed sections. The first section is padded with leading zeros and the second section is padded with trailing zeros to create two sections that are identical in size. Next, the two signals are summed to create a time dilated version of the input section. For example, in the case where a tone is dilated, the result will be a perfect tone, but larger in size, as shown in FIG. 2. The exact profile of the attenuation (and the number of zeros needed for padding) is determined by the delay found above. The result of the summation 202 is shown in the top portion of FIG. 2, while the original signal 204 without dilation is shown in the lower portion of FIG. 2. Another example of a section of 512 points is provided with reference to FIG. 4 for the WINDOWS "notify" sound. In FIG. 4, the original signal 404 is shown in the bottom portion of FIG. 4 and the dilated signal 402 is shown in the upper portion of FIG. 4. In testing, the time dilation process did not produce any audible distinctions. Referring now to FIG. 5, the two sections 502, 504 used to create signal 402 are shown.

Smoothing Packet Loss Recovery:

The padding method described above can also be used in Voice over Internet Protocol (VoIP) transmission systems, for example. Often when packets are lost a previous packet is duplicated to "close" the time gap. In an exemplary embodiment of the present invention, a smoothing out of the transition between the identical packets and the one following the duplicated packet with the method just introduced is envisioned.

Shaping the Transition:

In the exemplary embodiment described above, a linear fading (attenuation) function was used to allow a slow transition between the two sections. The present invention, however, is not so limited. It is important to note that other functions with "low-pass" characteristics can be used as long as the sum of the fade-in and fade-out function is a unity.

While the invention has been described in terms of exemplary embodiments, it is contemplated that it may be practiced as described above with variations within the scope of the following claims.

The invention claimed is:

1. A server, comprising:
   a memory device configured to store instructions; and
   a processing device configured to execute the instructions stored in the memory device to perform operations comprising:
   multicasting at least a first control signal to a plurality of elements;
   receiving a respective second signal from each of the plurality of elements in response to the first control signal, the second signal configured to indicate at least in part that each of the plurality of elements has reset a corresponding timer in response to receiving the first control signal;
   streaming digital data including at least one of audio information or video information to the plurality of elements in response to the second signals;
   multicasting a request for a timer state to each of the plurality of elements; and
   transmitting a time correction to at least some of the plurality of elements in response to a comparison between the timer state of the at least some of the plurality of elements and the timer state of a most latent of the plurality of elements.

2. The server of claim 1, wherein the operations further comprise:
   multicasting a third control signal to the plurality of elements;
   receiving a respective state signal from the plurality of elements in response to the third control signal; and
   comparing the respective state signals with one another to determine a time drift between each of the plurality of elements.

3. The server of claim 2, wherein the operations further comprise:
   generating a respective time drift correction command signal for at least one of the elements based on the comparison; and
   transmitting the time drift correction command signal to at least one of the plurality of elements.

4. The server of claim 3, wherein the operations further comprise transmitting, using unicasting, at least, one of the respective second signals, the respective state signals, or the time drift correction command signal or combinations thereof.

5. The server of claim 1, wherein the operations further comprise transmitting a null time drift correction command signal to one of the plurality of elements having a greatest time drift.

6. The server of claim 1, wherein the operations further comprise transmitting the content to at least a portion of the plurality of elements that are speaker adapted.

7. A system, comprising:
   a processor coupled to a plurality of network elements and configured to:
   multicast at least a first control signal to the plurality of elements;
   receive a respective second signal from each of the plurality of elements in response to the first control signal, the second signal configured to indicate at least in part that each of the plurality of elements has reset a corresponding timer in response to receiving the first control signal;
   stream digital data including at least one of audio or video information to the plurality of elements in response to the second signals;
   multicast a request for a timer state to each of the plurality of elements; and
   transmit a time correction to at least some of the plurality of elements in response to a comparison between the timer state of the at least some of the plurality of elements and the timer state of a most latent of the plurality of elements.

8. The system of claim 7, wherein the processor is further configured to:
   multicast a third control signal to the plurality of elements;

receive a respective state signal from the plurality of elements in response to the third control signal; and compare the respective state signals with one another to determine a time drift between each of the plurality of elements.

9. The system of claim 8, wherein the processor is further configured to:

generate a respective time drift correction command signal for at least one of the elements based on the comparison; and transmit the time drift correction command signal to at least one of the plurality of elements.

10. The system of claim 8, wherein the processor is further configured to transmit a null time drift correction command signal to one of the plurality of elements having a greatest time drift.

11. The system of claim 8, wherein the processor is further configured to transmit the content to at least a portion of the plurality of elements that are speaker adapted.

12. The system of claim 8, wherein the processor is further configured to transmit, using unicasting, at least one of the respective second signals, the respective state signals, or the time drift correction command signal or combinations thereof.

13. A device, comprising:

a memory device configured to store instructions; and a processing device configured to execute the instructions stored in the memory device to perform operations comprising:

multicasting at least a first control signal to a plurality of elements;

receiving a respective second signal from each of the plurality of elements in response to the first control signal;

streaming digital data including at least one of audio and video information to the plurality of elements in response to the second signals, the second signals configured to indicate at least in part that each of the plurality of elements has reset a corresponding timer in response to receiving the first control signal;

multicasting a request for a timer state to each of the plurality of elements; and transmitting a time correction to at least some of the plurality of elements in response to a comparison between the timer state of the at least some of the plurality of elements and the timer state of a most latent of the plurality of elements.

14. The device of claim 13, wherein the operations further comprise:

multicasting a third control signal to the plurality of elements;

receiving a respective state signal from the plurality of elements in response to the third control signal; and determining a time drift between each of the plurality of elements in response to the respective state signals.

15. The device of claim 14, wherein the operations further comprise:

generating a respective time drift correction command signal for at least one of the elements in response to the respective state signals; and transmitting the time drift correction command signal to at least one of the plurality of elements.

16. The device of claim 13, wherein the operations further comprise transmitting a null time drift correction command signal to one of the plurality of elements having a greatest time drift.

17. The device of claim 13, wherein the operations further comprise transmitting the content to at least a portion of the plurality of elements that are speaker adapted.

18. The device of claim 13, wherein the operations further comprise unicasting at least one of the respective second signals, the respective state signals, or the time drift correction command signal or combinations thereof to at least one of the plurality of elements.

19. A server, comprising:

a processing device configured to multicast a control signal to a plurality of network elements;

a receiver configured to receive a respective second signal from each of the plurality of network elements in response to the control signal, the second signal configured to indicate at least in part that each of the plurality of network elements has reset a corresponding timer in response to receiving the control signal; and a content transmitter configured to stream digital data including at least one of audio and video information to the plurality of network elements in response to the respective second signals;

wherein the processing device is further configured to:

multicast a request for a timer state to each of the plurality of network elements; and transmit a time correction to at least some of the plurality of network elements in response to a comparison between the timer state of the at least some of the plurality of network elements and the timer state of a most latent of the plurality of network elements.

* * * * *